(12) United States Patent
Sorrentino

(10) Patent No.: US 8,065,970 B2
(45) Date of Patent: Nov. 29, 2011

(54) HIGH-SPEED MULTIHULL BOAT

(76) Inventor: Richard Sorrentino, Marseille (FR)

( * ) Notice: Subject to any disclaimer, the term of this patent is extended or adjusted under 35 U.S.C. 154(b) by 774 days.

(21) Appl. No.: 11/995,478

(22) PCT Filed: Jul. 4, 2006

(86) PCT No.: PCT/FR2006/001587
§ 371 (c)(1),
(2), (4) Date: Jan. 11, 2008

(87) PCT Pub. No.: WO2007/006907
PCT Pub. Date: Jan. 18, 2007

(65) Prior Publication Data
US 2008/0250999 A1    Oct. 16, 2008

(30) Foreign Application Priority Data

Jul. 12, 2005    (FR) ..................................... 05 07477

(51) Int. Cl.
*B63B 1/00*     (2006.01)
(52) U.S. Cl. ........................................ 114/61.2; 114/290
(58) Field of Classification Search ................ 114/61.2, 114/288, 290, 291, 274
See application file for complete search history.

(56) References Cited

U.S. PATENT DOCUMENTS

| | | | |
|---|---|---|---|
| 3,148,652 A * | 9/1964 | Canazzi | 114/290 |
| 4,091,761 A | 5/1978 | Fehn | |
| 5,191,849 A | 3/1993 | Labrucherie et al. | |
| 5,435,260 A * | 7/1995 | Granie et al. | 114/290 |
| 5,673,641 A | 10/1997 | Sournat et al. | |
| 6,311,635 B1 * | 11/2001 | Vaton | 114/61.2 |
| 6,708,642 B1 | 3/2004 | Taylor et al. | |

FOREIGN PATENT DOCUMENTS

| | | |
|---|---|---|
| EP | 694 008 | 1/1996 |
| EP | 1082252 | 3/2001 |
| FR | 1523480 | 5/1968 |
| FR | 2661652 | 11/1991 |
| FR | 2765180 | 12/1998 |

* cited by examiner

*Primary Examiner* — Lars A Olson
(74) *Attorney, Agent, or Firm* — Merchant & Gould P.C.

(57)   ABSTRACT

A high-speed, multi-hull boat that includes at least three hulls (3, 4), and in which, with the boat being considered to be floating and stationary on a stretch of calm water (1), the cross sectional areas ($S_i$) of the space (18) formed between two walls (19) of opposing hulls, the surface of the water (1) and the bottom face ($2_1$) of the deck (2) facing this water surface, decrease from the bow to the stern. According to the invention, with the boat being considered to be out of the water, the heights (H) of the hulls between the same horizontal reference (R) and the lowest part (B) of their bottoms, are greater for the outer hulls (4) than for the central hulls (3) in the same cross-sectional plane.

11 Claims, 4 Drawing Sheets

HIGH-SPEED MULTIHULL BOAT

CROSS REFERENCE TO PRIOR APPLICATIONS

This is the U.S. national phase under 35 U.S.C. §371 of International Patent Application No. PCT/FR2006/001587, filed Jul. 4, 2006, which claims the benefit of French Application No. 05/07477, filed Jul. 12, 2005, both of which are incorporated by reference herein. The International Application was published in French on Jan. 18, 2007 as International Publication No. WO 2007/006907 A1 under PCT Article 21(2).

This present invention has as its subject a new type of high-speed multi-hull boat.

The technical area of the invention is the manufacture of multi-hull craft that use the aerodynamic pressure of the air passing between its hulls in order to lift the latter, and therefore the entire vessel, so as to reduce its submerged area and thus enable it to go faster.

In fact, we are familiar with different types of high-speed multi-hull boat using various hull designs in order to attain this result, some of which have been the subject of patent applications, such as:

The use of fins or hydrofoils which are partially or totally submerged in the direction of their length, and whose the inclined surface can be used to create hydrodynamic pressure so as to create lift and thereby increase the speed of the vessel, such as those described in patent application EP 694 008 published on 2 Jan. 1997, concerning a sail-rigged hydrofoil boat. Such a design does not work well in fairly calm seas however, since it is necessary to slave the inclination of the hydrofoils and the steering of the boat to the height and the frequency of the waves in order to maintain the pressure of these hydrofoils on the water and so that the raised hull does not impact the surface of the water with excessive violence.

The combination of different elements transforming the boat either into a single-hull or multi-hull vessel, as described in patent application EP 1082 252 published on 7 May 2003 and describing an ultra-fast hybrid boat whose the lateral hulls have less depth than the one of the central hull and equipped with several hydrodynamic pressure hydrofoils which are generators of lift. Such a design is complex and highly unstable, and its effectiveness has not been demonstrated.

The use of a funnel effect between the hulls, so that the increasing air pressure from the bow to the stern provides lift to the vessel, as described in patent application FR 2 661 652 published on 7 May 1990, which describes one or more central hulls that are shorter than the lateral hulls and located slightly back from the latter, with each hull having a width that increased continuously from its bow end to its stern end. Such a design is useful but is not sufficient to obtain good performance.

The use of aerodynamic lift by the use of lifting shapes located, either on either side of the boat, as with the wings of aircraft, or between two hulls as described in patent application FR 2765 180 published on 31 Dec. 1998, describing such aerodynamic shapes for the careened connecting arms linking the main central hull of the vessel with the lateral floating hulls.

In this last design, in order to achieve a veritable lift effect, it would be preferable to place such wings as close as possible to the water plane in order to create ground-effect funnels, but vessels using this single effect in order to achieve high speeds can nevertheless have difficulty navigating in choppy seas due to the proximity of these shapes to the water plane. Their potential time in operation is therefore low.

In addition, the difficulties encountered in this type of implementation is that, like any vessel, the resistance to forward movement in the water increases rapidly with the speed, which leads to the development of designs aimed at reducing the submerged area of the hulls, as with those described above. In this last example however, the speed of the boat, if it only partially uses the surface effect (by having the wings relatively distant from the water plane), remains at values that are below those which would be necessary so that the surfaces of the lift wings become effective and lift the boat sufficiently so that its resistance to forward movement in the water reduces significantly. This difficulty can be partially overcome either by increasing the power or the number of the engines, which will however be to the detriment of the unladen weight and therefore of the useful load, the fuel consumption, and the investment and maintenance costs, or by the combination of other resources, such as controllable submerged hydrofoils and/or special finesse and ratio coefficients between the different fairings, as described in the aforementioned patent application FR 2765 180.

The problem is so to build a boat that is designed to travel at high speed, without the need for large propulsive powers in relation to its movement, and capable of keeping its high performance levels even in choppy seas, without the drawbacks of the types of boats mentioned previously and allowing the hulls to be lifted as far as possible out of the water in order to achieve and to sustain these speed levels.

One solution to the problem is a high-speed multi-hull boat that includes at least three hulls, and in which, with the boat being considered to be floating and stationary on a stretch of calm water, the cross-sectional areas of the space created between two opposite hull walls, the surface of the water and the bottom face of the deck facing this water surface, decrease from the bow to the stern: according to the invention, with the boat being considered out of the water, the heights of the hulls between the same horizontal reference and the lowest part of their bottoms, are greater for the outer hulls than for the central hulls in the same cross-sectional plane.

Another solution to the problem is a high-speed multi-hull boat, either in accordance with the preceding type, or which has only two hulls with the same characteristics as above: according to the invention, the outer hulls are composed of at least two longitudinal parts, each forming a sort of half-hull in which the height of the outer part is greater than the one of the inner part of the same hull, the said heights being considered in the same horizontal reference, and the lowest part of the bottom of each part of this same hull.

Other preferred methods of implementation are described below and shown in the attached figures. The result is a new type of high-speed multi-hull boat which deals with the stated problem, and which overcomes the difficulties encountered in the current boat types, thanks to shapes that are less influenced by the waves, and resources to increase the aerodynamic lift and the surface effects at low speeds in order to sufficiently lift the boat before the resistance to forward movement in the water becomes prohibitive.

The arrangements according to the invention contributes qualities which do not exist in current boats.

Because of the aerodynamic lift, which is particularly high due to the self-generated air cushion with maximum use of surface effect, the submerged areas are very much reduced at nominal speed. As a consequence, the resistance to forward movement of the parts that remain submerged are particularly low, which, depending on the type of application, results in the division by at least two of the necessary engine power.

This results in a saving of engine weight and also in the fuel that has to be carried. This in turn provides scope for an increase in the useful load or for greater speed.

This type of boat can operate in speed ranges of between 30 and 60 knots, with a good annual use coefficient, while most of the current fast boats have difficulty reaching 35 knots.

Due to the combined action of the air cushion, the multi-hull effect, and the hydrofoils, the stability of the boat is significantly increased and the movements due to the waves are very much reduced. As a consequence, the comfort of the passengers or of the yachtsmen is much greater. In addition, due to the very sharp reduction of journey times combined with the absence of violent motion, even in relatively choppy seas, the fatigue and the impatience of the passengers is very much reduced. It is even possible, on some journeys, to completely avoid seasickness, while this is the common outcome as soon as the sea gets choppy, when in fact this is the main cause of discomfort and the rejection by many people of sea travel or excursions on the water.

It should also be noted that, due to their design, the boats according to the invention can be wider than other boats, which also contributes to greater comfort and living potential. As an example, a cruise craft measuring 25 meters in length can have a width of 12 to 13 meters, which gives a deck area of about 320 m2, this being far more than most of the other boats of this length.

The boats according to the invention can be driven by conventional submerged propellers, hydrojets, aerial propellers, semi-submerged surface propellers, or a combination of these.

Depending on the type of construction, a boat according to the invention could operate at 60 knots top speed with 2000 HP of drive power, while in the specialist press one can see boats with deck areas less than the 320 m2 mentioned above, with drive powers that can go up to 20000 HP for the same claimed speeds.

One could mention other advantages of this present invention, but those mentioned above are already sufficient to demonstrate its novelty and usefulness.

The description and the appended drawings provide examples of implementation of the invention, but have no limiting character. Other implementations are possible within the context of the scope and extent of this invention.

Figure 2:
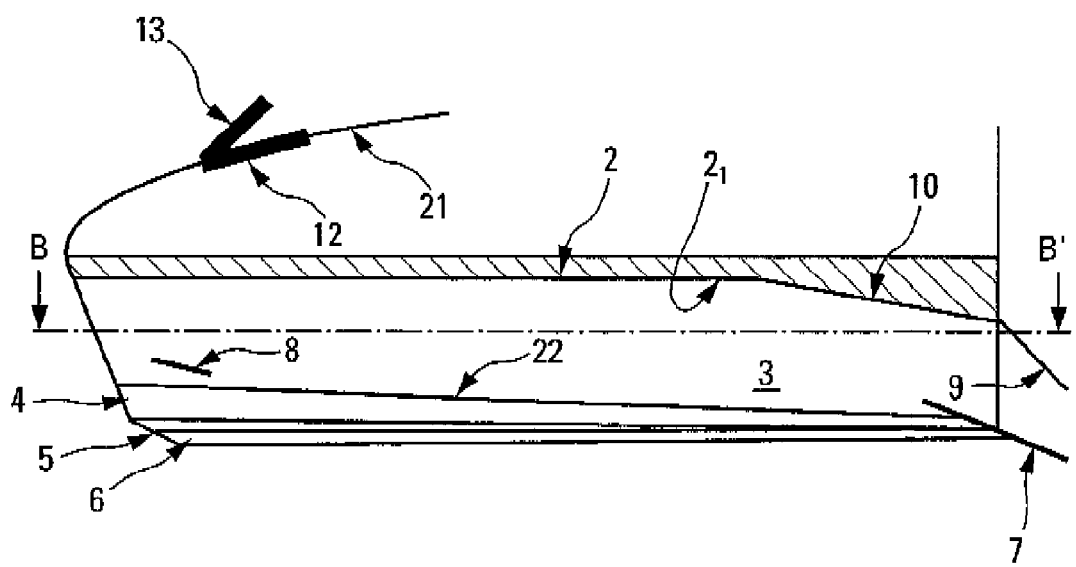
FIG. 2 is a diagrammatic view in longitudinal and vertical section along line A, A' of FIG. 3 of a vessel according to the invention.
Figure 3:
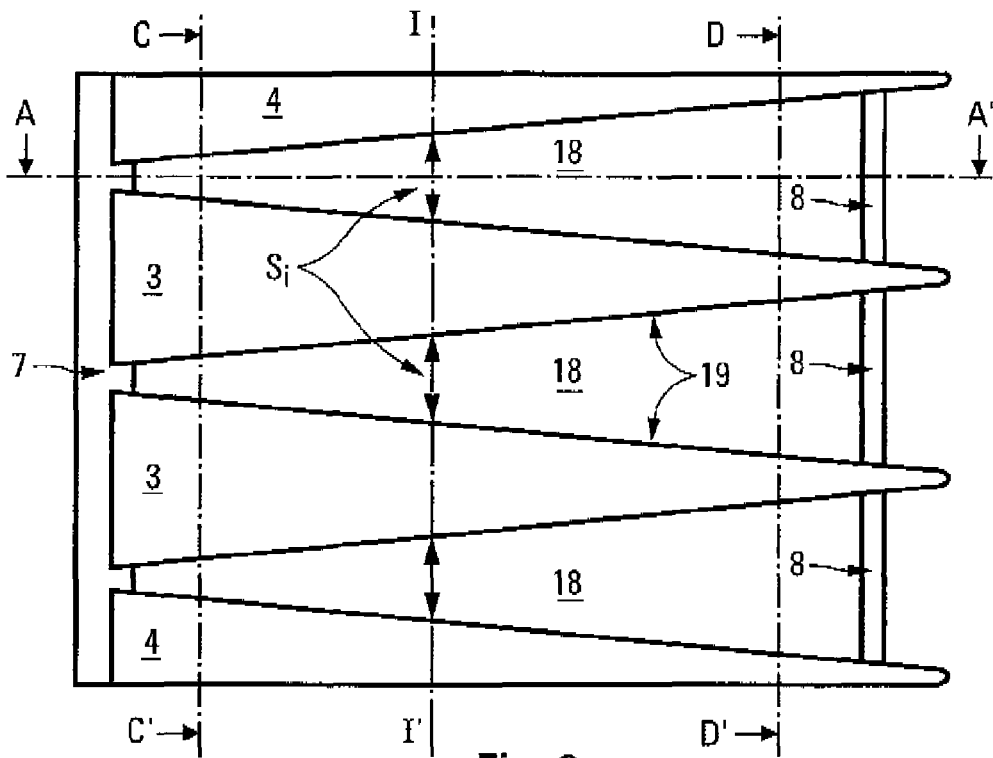
FIG. 3 is a diagrammatic view in horizontal section along line B, B' of FIG. 2.

FIG. (5) is a view in horizontal section along line B, B' of FIG. 2, of a vessel according to a method of implementation of the invention other than that of FIG. 3.

Figure 6A:
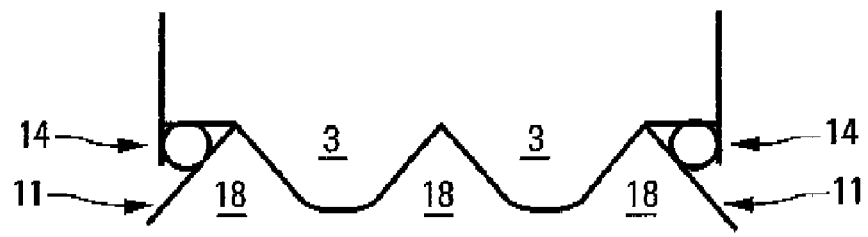
Figure 6B:
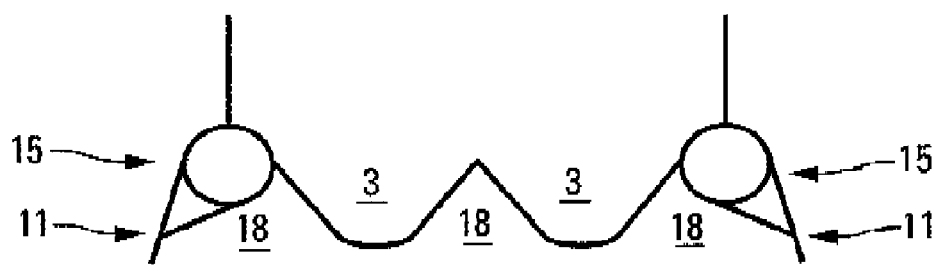

FIGS. 6A and 6B are views in rear cross section along line C, C' of FIG. 3, of other methods of implementation of the invention.

Figure 7A:
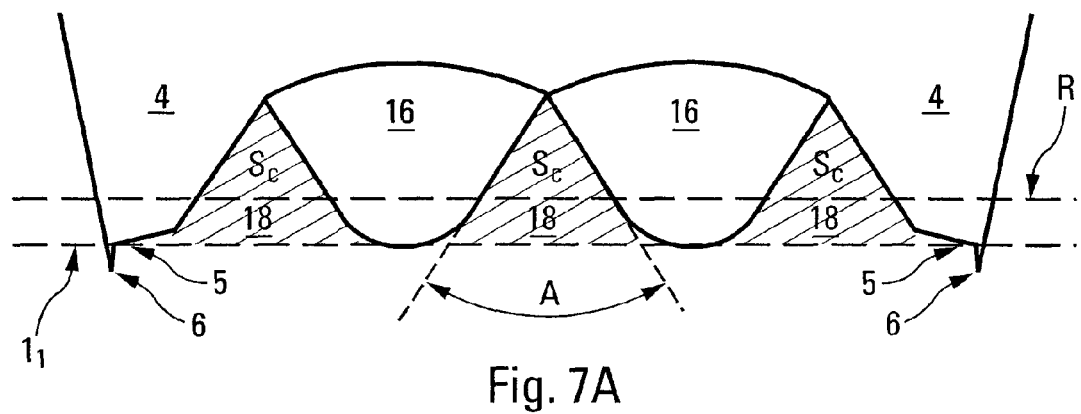
Figure 7B:
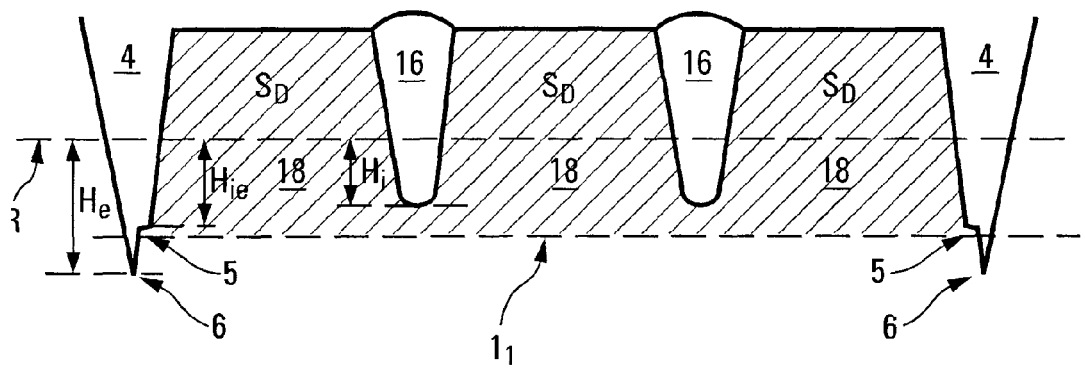

FIGS. 7A and 7B are views in front and rear section along lines C, C' and D, D' respectively of FIG. 3, of another method of implementation of the vessel according to the invention.

Figure 8:
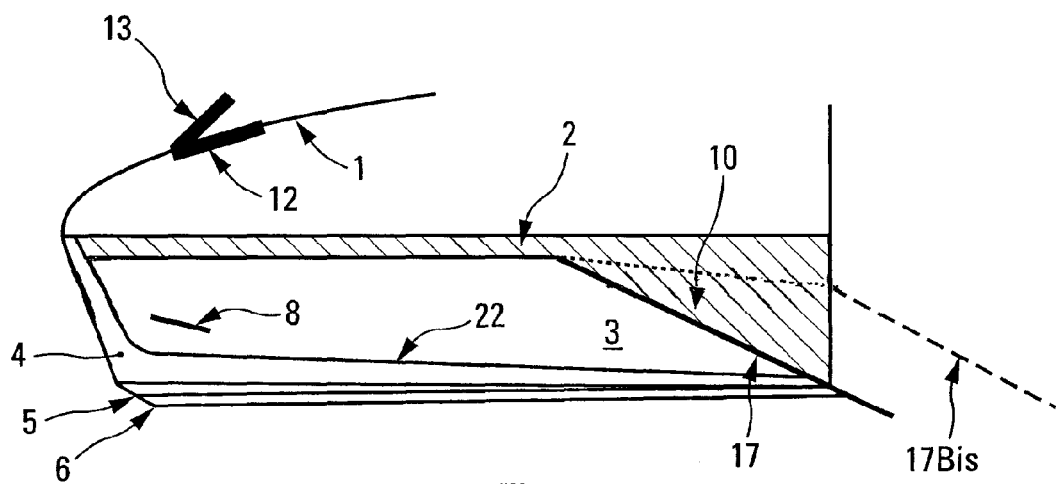

FIG. 8 is a view in longitudinal and vertical section along line A, A' of FIG. 3, of another implementation example of a vessel according to this present invention.

Figure 1:
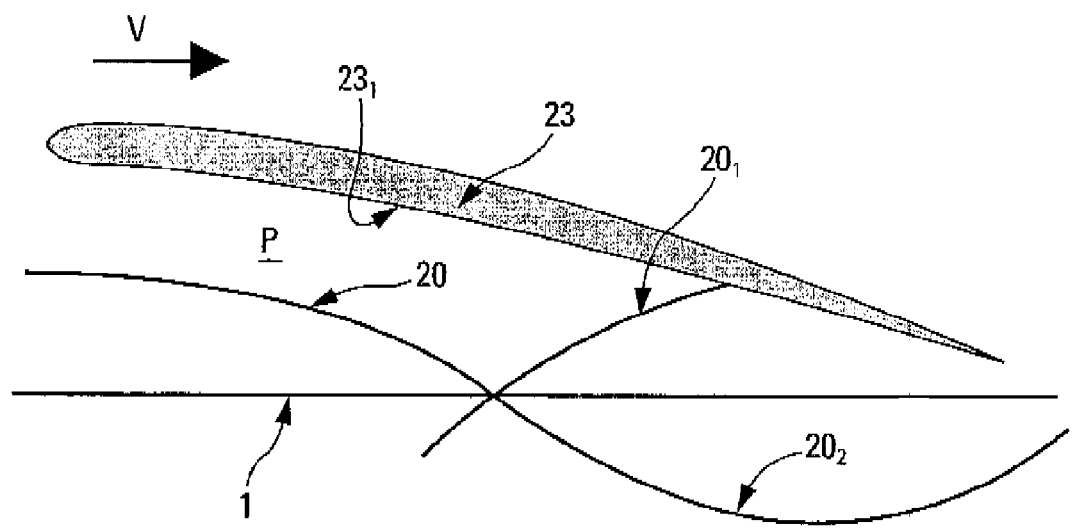
FIG. 1 is a diagrammatic representation in cross section of a known given aerofoil shape of the boats using aerodynamic lift at high speed.

As indicated previously, the known aerofoil shape 23 shown in FIG. 1 is placed as close as possible to the surface of the water plane 1 in order to increase the lifting force generated by the surface effect between its bottom face 231, and the surface of the water, by increasing the pressure P under the wing 23 when the relative speed V increases between the vessel and the ambient air, until balance is achieved. However, when waves 20 form, they impact upon the back 20, of the supporting wing 23, possibly causing damage to it, and in any case slowing the vessel. Then, during passage of the troughs 202 of the waves, the lift created by the surface effect reduces, creating an unbalance and causing great discomfort and inconvenience, and causing the vessel to slow.

The solution most often adopted to mitigate this drawback is to sufficiently distance the supporting wing 23 from the water plane, but then a large part of the aerial lift is lost, due to the significant reduction in the surface effect.

Figure 4A:
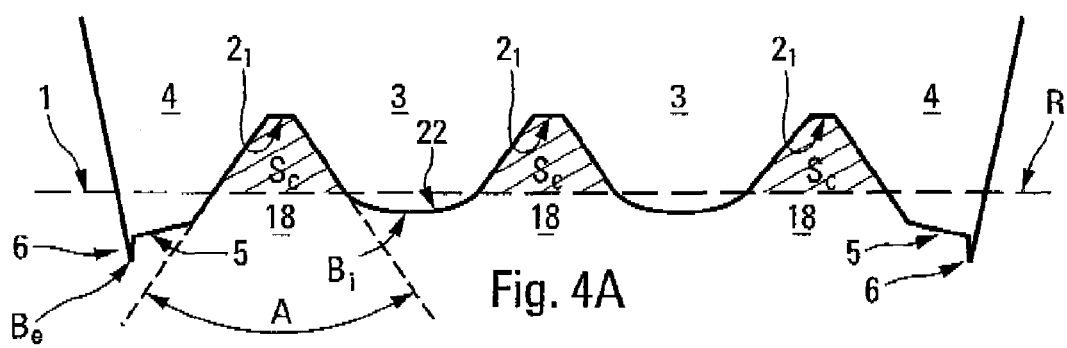
FIG. 4A is a view in rear cross section along line C, C' of FIG. 3.
Figure 4B:
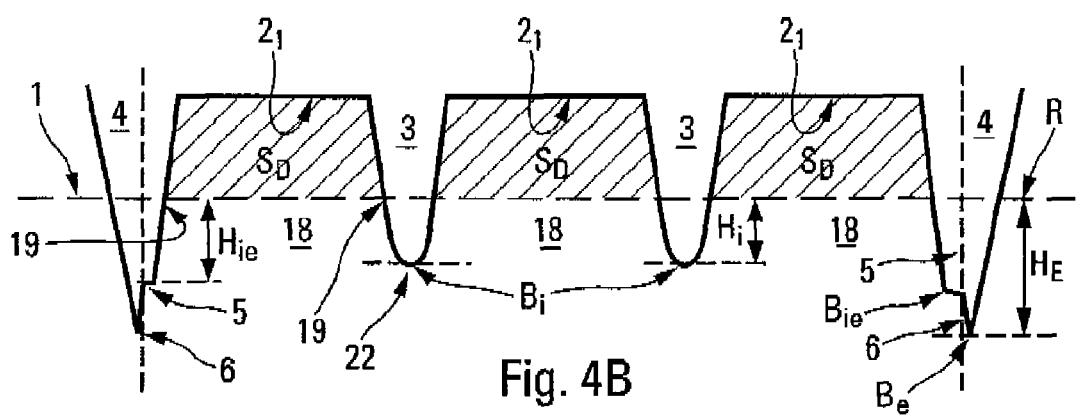
FIG. 4B is a view in front cross section along line D, D' of FIG. 3.

In this present invention, the multi-hull boat can have three hulls or more, and is illustrated with four rigid or flexible hulls in FIGS. 3, 4A, 4B, 5, 6A, 6B, 7A and 7B, but it can also have only two with outer hulls 4 and no inner hulls 3 or 16 but, as shown in FIGS. 4A, 4B, 7A and 7B, composed of at least two longitudinal parts each forming a sort of half-hull, as outlined diagrammatically by vertical broken lines on the hulls 4 of FIG. 4B. The height $H_e$ of the outer part 6 is greater than that $H_{ie}$ of the inner part 5 of the same hull, where the said heights $H_e$ and $H_{ie}$ are considered in the same cross-sectional plane of the whole hull and, between the same horizontal reference R, which can, in this implementation example, be the surface of a stretch of calm water 1 on which the vessel is floating, and the lowest part, $B_e$ and $B_{ie}$ respectively of the bottom of each part of this same hull.

In the case of central hulls, the heights H of the hulls, still between the same horizontal reverence R and the lowest part B of their bottoms, are greater for the outer hulls 4 than for the central hulls 3 in the same cross-sectional plane from the bow (front) to the stern (back) of the whole hull.

In fact, the heights H of hulls as described above, can be, and even must be for flexible hulls as described below, considered out of the water, where the reference R can be any horizontal plane located above the lower part B of the hull of reduced height.

Whatever the number and the type of hulls, where the boat is considered to be floating on a stretch of calm water 1, the surfaces Si of any cross section I, I' of the space 18 created between two walls 19 of opposing hulls, the area of the water 1 and the bottom face $2_1$ of the deck 2 facing this surface decreases from the bow to the stern. As an example, the surfaces $S_c$ of FIGS. 4A and 7A, corresponding to the stern section CC' of FIG. 3, are smaller than the surfaces $S_p$ of FIGS. 4B and 7B corresponding to the stern section DD' of FIG. 3.

The hulls 3, 4 are strengthened by all reinforcing structures which link them together at the level of the deck 2 by watertight surfaces from the front of the boat to the back, in order to form a watertight barrier between the bottom and the top of the boat.

These watertight bottom surfaces $2_1$ of the parts of the deck 2 located between two adjacent hulls 3, 4 are horizontal, at nominal speed, in the front part of the vessel, as shown in FIGS. 2 and 8, and are inclined to the surface of the water 1 in the stern part 10 of the boat.

In FIG. 8, for ships travelling on stretches of calm water, the stern part 10, inclined by some 4 degrees, can descend to the level of the water and even below the latter, constituting a sort of fixed shutter completely stopping up the spaces 18 between the hulls in the stern part of the boat. This part 17 of the deck extends under the water, and in fact is coincident with the back hydrofoil 7 represented in the other methods of implementation.

Depending on the implementations, this fixed shutter 17 can assume position 17 or 17 bis, or possibly an intermediate position. In any event, the end of the fixed shutter constitutes a rear hydrofoil. In the case where this fixed shutter is extended rearwards of the stern of the boat, as in position 17 bis, the lateral extremities (right and left) of the fixed shutter are shut off between the shutter, the stern of the vessel and the surface of the water, by a watertight vertical panel. This panel attaches the extremity of the fixed shutter to the stern of the vessel. It also maintains the air pressure underneath the shutter. To this end, this panel descends into the water to the same level as the lowest part of the outer hulls.

In fact, in a preferred method of implementation, the boat according to the invention includes hydrofoils 8 located in the bow and the stern 7 pads of these hulls 3, 4, which are partially submerged at nominal speed, in fact making a permanently submerged upper surface (except between the hulls during the passage of waves) and a lower surface that is almost always totally submerged over the whole of its length.

Figure 5:
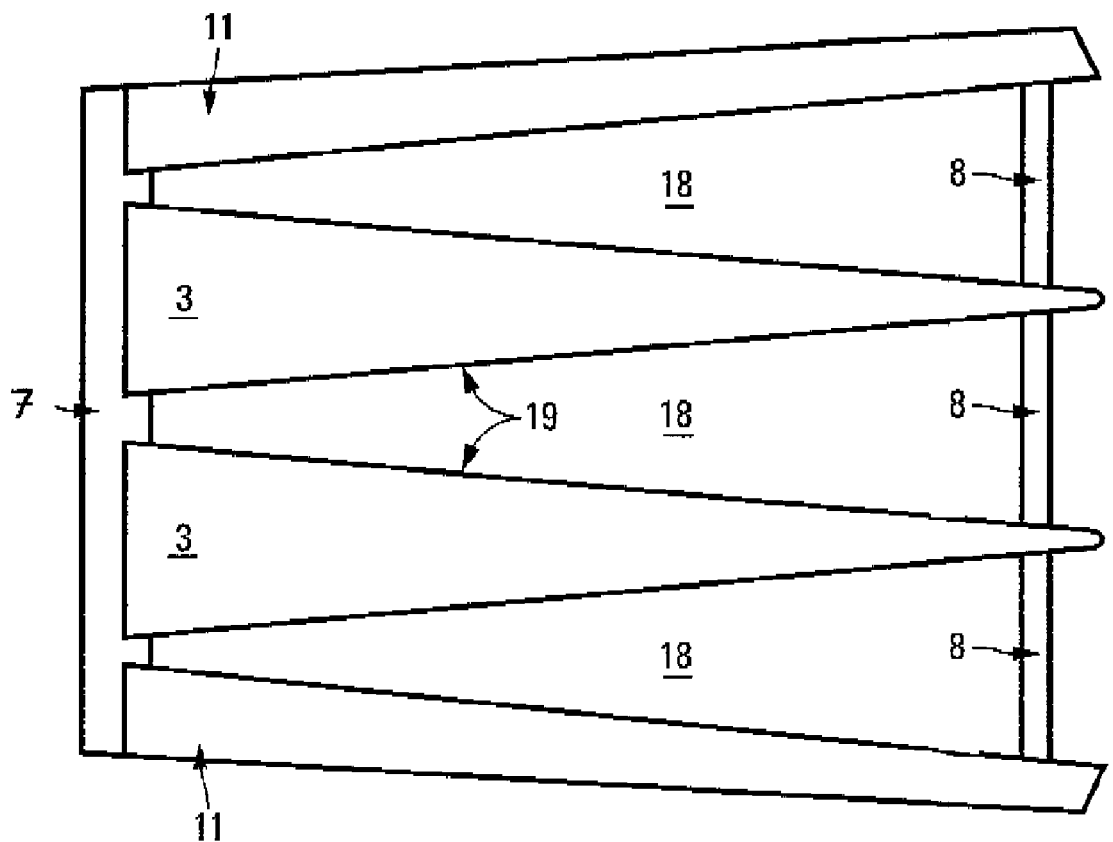

These said hydrofoils 7, 8 have as their length the width of the stern, and connect the hulls together, as can be seen in FIGS. 3 and 5. Since their front edges are high in relation to their rear edges, they preferably make an angle of between 2 and 6 degrees with the water plane 1 at nominal speed.

The back hydrofoils 7 are extended to the back, rearwards of the stern of the boat, thus forming a continuous hydrofoil from one side to the other of the latter, and penetrate in part between the spaces separating the adjacent hulls.

The front hydrofoils 8 are either totally between the hulls, in order to allow them to beach by the front, or partially to totally below the opposing hulls.

As can be seen firstly in FIGS. 4A and 4B and secondly in FIGS. 7A and 7B, the angle A formed by the two walls 19 of any opposing adjacent hulls 3, 4 increases from the bow to the stern.

In addition, the bottom 22 of the central hulls 3 is more inclined from the bow to the stern than the one 6 of the lateral outer hulls 4, as can be seen in FIGS. 2 and 8, and in the case where the outer hulls 4 are in two longitudinal parts of different height, the bottom 5 of the inner part of these hulls 4 is more inclined from the bow to the stern than the one of the bottom 6 of the outer part of these same hulls.

Depending on the methods of implementation of FIGS. 3 and 5, the outer hulls 4 are asymmetrical and narrower than the central hulls 3, and in the case where these outer hulls are in two parts of different heights, the outer part 6 of these outer hulls is narrower than the inner part 5 of these same hulls.

The outer part 6 of these hulls can be made up from lateral stabilisers or composed of additional or attached lateral stabilisers, and preferably, though this is not obligatory, the outer hulls 4 are longer than the central hulls 3.

Depending on the particular methods of implementation, as presented in FIGS. 6A, 6B, 7A and 7B, a part at least of these hulls 11, 14, 15, 16 is made from a flexible material that is designed to flex partially under the hydrodynamic pressure of the water 20, and in order to ensure the airtight nature of the volumes 18 which these hulls 16 form with their adjacent hulls, at least at the back and up to the maximum lifting of the boat in respect of inner hulls 16 and in all of the situations concerning the outer hulls 11, 14, 15.

Thus, the invention also concerns any boat that includes the simultaneous combination of flexible inner hulls and flexible outer hulls, with at least two rigid hulls of course. In a preferred method of implementation, such a boat can have five hulls, with one flexible central hull, one rigid hull on either side, and one flexible hull on either side of the two rigid hulls on the outside (in fact making a catamaran with two rigid hulls, as known at the present time, but with a flexible central hull between these two rigid hulls and two flexible hulls on the outside of the latter).

In the variants in FIGS. 6A and 6B, the outer hulls 14, are composed of skirts 11 in a flexible material covering the side of the boat from the front to the back, whose length is more or less equal to that of the outer hulls. These so-called skirts are positioned at a distance from the inner hulls located opposite, which decreases from the bow to the stern, as for rigid outer hulls.

Moving from top to bottom, these skirts 11 are more or less inclined from the inside to the outside and are held in position at the top, allowing the hydrodynamic pressure of the air under the deck in the space 18 to be maintained without towing any water.

Their flexibility allows them to flex partially under the hydrodynamic pressure so that they can skim the surface of the water and allow the waves to pass, without however allowing the air to escape to the outside.

Preferably, a device can be used to adjust the pressure to maintain the skirt in a position of maximum airtightness, in accordance with the speed of the boat, its loading, and the sea and wind conditions, as in the following example:

According to FIG. 6A, a longitudinal roll-moulding or hose 14 filled with a gas at variable pressure is applied against or affixed to the outer upper part of the skirt.

According to FIG. 6B, the said skirt is fixed below one or more longitudinal roll-mouldings or hoses 15 filled with a gas at variable pressure.

In the methods of implementation of FIGS. 7A and 7B, the inner hulls 16, or the lower part of the latter, which are created using with the same technique as the roll-mouldings of inflatable boats. They have the same outside shape as the hulls of the basic rigid version described previously. However, when they are playing no part in the rigidity of the structure, they can be made from a fabric that is much lighter and more flexible. They are filled with a gas at a pressure which is adjusted as a function of the speed of the boat, and slightly above the dynamic pressure of the air which is present under the boat at high speed. Their flexibility allows them to flex partially under the hydrodynamic pressure while remaining in contact with the surface of the water and allowing the waves to pass under them, without allowing the air to pass.

In fact, as the vessel gathers speed, and as it rises due to the lift forces created by the air entering the spaces 18 between the hulls, and because, in accordance with the present invention, of the different heights of the hulls or half-hulls, which is greater for those outside than for those inside, the total submerges area of the hulls reduces until the bottom $B_j$ of the central hulls 3, 16 and even that $B_j$ of the inside parts 5 of the outer hulls 4 as shown in FIGS. 7A and 7B, skim surface of the water 1, allowing a large reduction in the total submerged area of the hulls. This can be used attain and to maintain a high speed without necessitating a large amount of drive power, with the air being maintained within the hulls by the lateral hulls and/or their outside part 6 of greater height, which therefore always remains submerged, also providing greater stability to the whole of the vessel.

In order to increase still further the lifting effect of the air entering into the spaces 18 between the hulls, the boat according to the invention includes mobile shutters 9 positioned near the stern between two opposing hulls 3, 4, and at least partially closing off the passage of the air, the said shutters being designed to remain closed under and despite the dynamic pressure of the air alone, and to reduce their profile partially on the passage of the water, especially when it concerns waves 20 as shown in FIG. 1.

Such shutters can be rigid or semi-rigid, and held firmly in position by springs that maintain the dynamic pressure of the air under the deck 2, and partially flexing under the hydrodynamic pressure of the water on the passage of the waves, but nevertheless without allowing a lot of air to pass, or even any at all.

A device is used preferably to adjust the push and the rigidity of the mobile shutters according to the speed of the boat, its loading, and the sea and air conditions, as in the following case for example:

A hose filled with a gas at variable pressure applied against or affixed to the shutter at its upper part, Or fixing of the shutter below a hose filled with a gas at variable pressure.

These mobile shutters could also be composed of watertight envelopes in light and flexible fabric held in place by springs or inflated with a gas whose pressure is adjustable and whose pressure is sufficient to prevent the passage of air to the rear of the tunnels 18, but low enough to allow the envelope to reduce its profile slightly under the hydraulic force of the waves.

It is also possible to use fluid shutters or water curtains, alone or in combination with rigid or semi-rigid shutters, or composed of a flexible material, as indicated above. These water curtains can be created by pumping seawater through a rose.

In one particular method of implementation, the cooling air of the engines and inboard equipment is injected under the deck 2 into at least a limited space 18 between two opposing hulls.

The propulsion system can include at least one resource to regulate or adjust the effective drive of the propulsion resource(s), such as variable-pitch propellers and/or speed controls.

For raisons of safety, in order that, at high speed or in storm conditions, the boat is not put in danger of overturning because it lifts at the front, it includes articulated safety shutters 12, 13 located above and in the bow part of the boat, these shutters being flattened 12 against the superstructure 21 of the boat in their normal position and being designed to lift 13 by rotation facing the front in the safety position.

The invention claimed is:

1. A multi-hull boat comprising:
a bow, a stern and at least three hulls including outer hulls and at least one central hull,
wherein at least a longitudinal portion of each hull is submerged and a longitudinal portion of each hull is not submerged when the boat is floating stationary on a stretch of calm water,
wherein the area of a cross-section taken along a longitudinal axis of said boat of a space which is created between two opposing hull walls of adjacent hulls, the surface of the water, and an unsubmerged bottom face of a deck facing the water surface, decreases from the bow to the stern,
wherein an angle formed by the two opposing hull walls increases from the bow to the stern, and
wherein when the boat is out of the water, heights of the hulls, between a horizontal reference and a lowest part of the bottom of the hulls, are greater for the outer hulls than for the at least one central hulls in the same cross sectional plane.

2. The boat according to claim 1, wherein the bottom of the at least one central hulls is more inclined from the bow to the stern than at least one of the outer hulls.

3. A boat according to claim 1, wherein the outer hulls are asymmetrical and narrower than the central hull or hulls.

4. The boat according to claim 1, wherein the outer hulls are longer than the at least one central hulls.

5. The boat according to claim 1, wherein a part of said hulls is created in a flexible material that is designed to flex partially under the hydrodynamic pressure of the water and to ensure the airtightness of the volumes formed by two adjacent hulls.

6. The boat according to claim 1, wherein portions of the bottom faces of the deck located between two adjacent hulls are inclined to the surface of the water in the stern part of the boat relative to portions of the bottom faces of the deck that are forward of the stern part of the boat.

7. The boat according to claim 1, wherein the boat further comprises an engine and inboard equipment and wherein cooling air from the engine and from the inboard equipment is injected under the deck into at least one space formed between two opposing hulls.

8. A multi-hull boat comprising:
a bow, a stern and at least three hulls including outer hulls and at least one central hull,
wherein at least a longitudinal portion of each hull is submerged and a longitudinal portion of each hull is not submerged when the boat is floating stationary on a stretch of calm water,
wherein the area of a cross-section taken along a longitudinal axis of said boat of a space which is created between two opposing hull walls of adjacent hulls, the surface of the water, and an unsubmerged bottom face of a deck facing the water surface, decreases from the bow to the stern,
wherein when the boat is out of the water, heights of the hulls, between a horizontal reference and a lowest part of the bottom of the hulls, are greater for the outer hulls than for the at least one central hulls in the same cross sectional plane,
further comprising mobile shutters positioned near the stern between two opposing hulls, and at least partially closing off the passage of air between the opposing hulls, the said shutters being designed to remain closed under dynamic pressure of the air alone, and to reduce their profile partially on the passage of the water.

9. A multi-hull boat comprising:
a bow, a stern and at least three hulls including outer hulls and at least one central hull,
wherein at least a longitudinal portion of each hull is submerged and a longitudinal portion of each hull is not submerged when the boat is floating stationary on a stretch of calm water,
wherein the area of a cross-section taken along a longitudinal axis of said boat of a space which is created between two opposing hull walls of adjacent hulls, the surface of the water, and an unsubmerged bottom face of a deck facing the water surface, decreases from the bow to the stern,
wherein when the boat is out of the water, heights of the hulls, between a horizontal reference and a lowest part of the bottom of the hulls, are greater for the outer hulls than for the at least one central hulls in the same cross sectional plane,
further comprising hydrofoils located in a bow part and a stern part of said hulls, the hydrofoils being configured to be partly submerged when the boat travels at nominal speed over a stretch of calm water.

10. The boat according to claim 9, wherein the hydrofoils have as their length the width of the boat, and connect the hulls together.

11. A multi-hull boat comprising:
a bow, a stern and at least three hulls including outer hulls and at least one central hull,
wherein at least a longitudinal portion of each hull is submerged and a longitudinal portion of each hull is not submerged when the boat is floating stationary on a stretch of calm water,
wherein the area of a cross-section taken along a longitudinal axis of said boat of a space which is created between two opposing hull walls of adjacent hulls, the surface of the water, and an unsubmerged bottom face of a deck facing the water surface, decreases from the bow to the stern,
wherein when the boat is out of the water, heights of the hulls, between a horizontal reference and a lowest part of the bottom of the hulls, are greater for the outer hulls than for the at least one central hull in the same cross sectional plane,
further comprising articulated safety shutters located above and in the bow part of the boat, these shutters being flattened against an exterior of the boat when the shutters are in a normal position, and being designed to be raised facing the front in a safety position.

* * * * *